(12) United States Patent
Kuhn

(10) Patent No.: US 7,671,633 B2
(45) Date of Patent: Mar. 2, 2010

(54) GLITCH FREE 2-WAY CLOCK SWITCH

(75) Inventor: Ruediger Kuhn, Freising (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/266,040

(22) Filed: Nov. 6, 2008

(65) Prior Publication Data

US 2009/0121744 A1    May 14, 2009

(30) Foreign Application Priority Data

Nov. 8, 2007    (DE) .................. 10 2007 053 128

(51) Int. Cl.
*H03K 19/00*    (2006.01)
(52) U.S. Cl. ................... 326/93; 326/94; 326/99
(58) Field of Classification Search ............ 326/93–95, 326/99; 327/141, 291, 298
See application file for complete search history.

(56) References Cited

U.S. PATENT DOCUMENTS

| 5,604,452 | A | 2/1997 | Huang |
| 6,927,604 | B2 * | 8/2005 | Boerstler et al. ............... 326/93 |
| 7,423,459 | B2 * | 9/2008 | Hashimoto et al. ............ 327/99 |
| 2005/0040855 | A1 | 2/2005 | Boerstler et al. |

* cited by examiner

*Primary Examiner*—Anh Q Tran
(74) *Attorney, Agent, or Firm*—Robert D. Marshall, Jr.; Wade J. Brady, III; Frederick J. Telecky, Jr.

(57) ABSTRACT

The present invention switches between a first clock signal (CLK0) and a second clock signal (CLK1). Each input signal is buffered by a corresponding tristate buffer (TBUF0, TBUF1). A multiplexer (MUX) receives the tristate buffer outputs and selects one clock signal in response to a multiplexer control signal (MUX_SEL). A control stage (CONTROL) received a clock selection signal (SEL) and provides multiplexer control signal (MUX_SEL). A change in multiplexer control signal (MUX_SEL) is triggered by a next edge of target clock (CLK1) following a delay. This prevents glitches in the output signal.

11 Claims, 5 Drawing Sheets

GLITCH FREE 2-WAY CLOCK SWITCH

CLAIM OF PRIORITY

This application claims priority under 35 U.S.C. 119(a) to German Patent Application No. 10 2007 053 128.3 filed Nov. 8, 2007.

TECHNICAL FIELD OF THE INVENTION

The technical field of this invention is an electronic device having a clock buffer and clock switching circuit switching between a first and a second clock signal without generating a clock glitch.

BACKGROUND OF THE INVENTION

In various electronic devices it is desirable to switch between different clock signals. This is typically implemented by a clock switch having clock buffers and a multiplexer. The clock signals are buffered by the clock buffers. These clock buffers have a tristate mode. In the tristate mode the clock buffer output has a high impedance state (tristate buffer). In an example of the prior art a first tristate buffer receiving the first clock signal is switched into the high impedance mode and a second tristate buffer receiving the second clock signal is switched ON. This provides the buffered second clock signal at the output. The outputs of both buffers are coupled to a multiplexer. The multiplexer switches to output the required clock signal. The main problem with clock signal switching are glitches in the output signal that can occur if the multiplexer or buffer switching coincides with edges of a clock signal.

Glitches can be avoided by switching OFF the clock signals at a predefined moments synchronous with their edges. FIG. 1 illustrates such a switching procedure. A first clock signal CLK0 and a second clock signal CLK1 are supplied to a multiplexer. The multiplexer is controlled by a multiplexer control signal SEL_MUX. An asynchronous select signal ASYN_SEL indicates with a transition from low to high when the output of the multiplexer should be switched from outputting first clock signal CLK0 to outputting second clock signal CLK1. This system does not switch from first clock signal CLK0 to second clock signal CLK1 immediately. A synchronization step is first performed. The synchronized select signal SEL_SYNC is synchronized to first clock signal CLK1. Thereafter, multiplexer control signal SEL_MUX is switched from low to high in order to switch first clock signal CLK1 to the output of the multiplexer with a falling edge of first clock signal CLK1 with a rising edge of the asynchronous select signal ASYN_SEL. First clock signal CLK0 is initially locked in its current state (either 0 or 1). In the present example this is state 0. Therefore, the output signal CLKOUT remains at a logical 0 until the output of the multiplexer is switched in response to multiplexer control signal SEL_MUX. Glitches can still occur when a conventional clock switch is turned ON, i.e. when the switch is connected to the supply voltage. Clock switches according to the prior art therefore need a well defined RESET pulse to enter a valid initial state after powering up the electronic device. However, such an asynchronous RESET performed with a prior art clock switch fails to prevent all clock switching glitches.

SUMMARY OF THE INVENTION

According to the present invention, an electronic device includes a clock switch switching between a first clock signal and a second clock signal. The clock switch includes a first tristate buffer buffering the first clock signal. This first tristate buffer has a control input receiving a first tristate control signal. A second tristate buffer buffers the second clock signal. This second tristate buffer has a control input receiving a second tristate control signal. A multiplexer receives the output of the first tristate buffer and of the second tristate buffer. The multiplexer outputs either the first clock or the second clock signal in response to a multiplexer control signal. A control stage receives a clock selection signal which indicates output of the first clock signal or the second clock signal. The control stage provides the multiplexer control signal. The control stage changes the multiplexer control signal from the first state to the second state triggered by an edge of the second clock and a changes the multiplexer control signal from the second state to the first state triggered by an edge of the first clock signal. The multiplexer control signal is logically gated with the clock selection signal to produce the first tristate control signal and the second tristate control signal.

The electronic device including the clock switch uses a feedback connection of the multiplexer control signal in combination with the clock selection signal. The selection signal has two states and the multiplexer control signal has two states, therefore there are four states defined by the two input signals. The control stage operates as a state machine in response to the clock selection signal and the multiplexer control signal reflecting the current state of the clock switch. If the clock selection signal is switched from one state to the other indicating a command to switch to another clock signal, any difference between the state of the multiplexer control signal and the state of the clock selection signal is used to indicate the clock switch has not settled. Using the multiplexer control signal in combination with the clock selection signal, it is possible to prevent undefined initial states after powering up the electronic device. There are either final states, when the corresponding states of the two signals both have the same target output clock signal or transitional states, when the two signals have different target output clocks. Transitional states are exited by changing the multiplexer control signal. The transitional state is detected in the control stage.

According to an aspect of the present invention, the inverted multiplexer control signal and the clock selection signal are logical ANDed to produce the first tristate control signal. The multiplexer control signal and the inverted clock selection signal are logical ANDed to produce the second tristate control signal. The first and the second tristate control signals control the respective tristate buffers. Logical ANDing of the multiplexer control signal and the clock selection signal permit control of the state of the tristate buffers in response to the output state and the target state of the clock switch indicated by the clock selection signal. The tristate buffers are controlled in the final and transitional states. This provides additional degrees of freedom in clock switch control as, for example, the tristate buffers can be switched ON or into tristate in accordance with the final or the transitional states.

According to another aspect of the present invention, the control stage assumes a first static state when the clock selection signal and the multiplexer control signal are both in the first state and assumes a second static state when the clock selection signal and the multiplexer control signal are both in the second state. According to this aspect of the invention the clock selection signal and the multiplexer control signal both indicate the same clock signal to be output by the multiplexer. If so, the control stage and the clock switch are in a first static state where no internal control signals are to be changed. In particular, during the first static state and the second static state it is possible to switch both tristate buffers ON. Thus it is possible to use the other clock signal when one clock signal fails. This aspect of the invention helps to avoid errors due to clock failures.

The control stage according to the present invention assumes a first transitional state when the clock selection signal is in the first state and the multiplexer control signal is in the second state. Further, the control stage assumes a second transitional state when the clock selection signal is in the second state and the multiplexer control signal is in the first state. Accordingly, the control stage has four different states; two static states and two transitional states. The transitional states are defined as the states when the multiplexer control signal output from the control stage is different than the clock selection signal input to the control stage. In this situation, the control stage has to change the multiplexer control signal in response to the clock selection signal to match the clock selection signal. However, the transitional states can be used to perform specific internal control functions. For example, in the first transitional state, the second tristate control signal can set the second tristate buffer into tristate. Then, the output signal of the first tristate buffer can be used to trigger a change of the state of the multiplexer control signal from the second to the first state. Accordingly, the switching of the multiplexer control signal is synchronized with the first clock, which is the target output clock. Further, in the second transitional state, the first tristate control signal sets the first tristate buffer into tristate and the output signal of the second tristate buffer can be used to trigger a change of state of the multiplexer control signal from the first to the second state. Accordingly, the target output clock is used to perform the switching. This provides internal synchronization to the target output clock. Further, the other clock signal can be temporarily and internally switched OFF. However, once the clock switch has settled to a static state, both tristate buffers can be switched ON so that both buffered clock signals are available to the electronic device.

According to an aspect of the present invention uses a specific delayed tristate buffer. The tristate buffer of this invention switches into a high impedance state in response to a first (internal) configuration signal that is set in response to a control signal. This is a tristate control signal applied to the tristate buffer. The tristate buffer includes a regenerative loop circuit coupled to the output to maintain the output signal when the tristate buffer is switched into the high impedance state. A delay stage in the input of the tristate buffer delays the input signal. A gating stage in the buffer has inputs receiving the input signal, a delayed version of the input signal and an asynchronous tristate control signal indicating that the buffer is to be switched into the high impedance state. The gating stage has an output coupled to the tristate buffer to provide a first configuration signal. Further, the gating stage sets the first configuration signal only when the tristate control signal is set and the input signal and the delayed signal have logical levels indicating that no signal transition within the delay stage. The delayed signal can be the output signal of the tristate buffer. Accordingly, in the delayed tristate buffer an input signal is delayed by the delay stage. The delayed input signal is then buffered by the tristate buffer to produce an output signal. The gating stage receives the input signal and a delayed signal, which can be an output of the delay stage or the output of the tristate buffer. When the tristate buffer is to be switched into a high impedance state, the gating stage receives a tristate control signal. Only when the tristate control signal is received at the gating stage, and both the input signal and delayed signal have logical levels indicating that no signal transition of the input signal is propagating in the delay stage, does the gating stage output the first configuration signal to the tristate buffer that switches it into a high impedance state. Practically, a transition propagating through the delay stage can be detected by equal or different logical levels of the input signal and the delayed signal. The delayed signal may be the output signal of the tristate buffer, but also a delayed version of the input signal, which can be an output signal of the delay stage. While the tristate buffer is being switched into the high impedance state, the regenerative loop connected to the output of the tristate buffer holds the output signal. Thus the logical level of the output signal is maintained when the buffer goes into tristate. Gating the first configuration signal in the described way and using the delay stage means that any possible glitch generation is moved out of the signal path of the buffer. Due to the delay stage, the switching of the tristate buffer has a temporary advance with respect to the input signal. If the amount of delay is carefully chosen, any transition or edge of the input signal can be prevented from passing through the tristate buffer during switching into high impedance mode. Furthermore, the present invention provides a circuit that is simple, only requires a small area and consumes only a small amount of power.

Still with respect to the delayed tristate buffer, the input signal is a clock signal and the delay stage delays the input signal a time shorter than half a clock period of the clock signal. The delay stage delays the input signal by an amount shorter than half a clock period of the input signal. Theoretically, the delay should be longer than $2nT/2$ and shorter than $(2n+1)T/2$, where T is the clock period of the input clock signal and n is an integer equal to or greater than 0. The tristate control signal is asynchronous with the input signal. If the tristate control signal is gated with the input signal and the delayed signal, a delay of less than half a clock period prevents glitches during the transition into hold mode, i.e. into high impedance mode of the tristate buffer. Practically, no glitches in the buffer output signal can occur due to switching of the tristate buffer into its high impedance state coinciding with a transition in the input (clock) signal.

In the tristate buffer, the delay stage is a chain of a plurality of inverters. The inverters which form the delay stage are connected in series between the input and the tristate buffer. Each inverter may is a complementary pair of MOS transistors. This simplifies circuit design and means that existing design libraries can be used for the electronic circuit.

The gating stage in the delayed tristate buffer according to the present invention preferably includes a latch. This latch is only set if the tristate control signal is set and the input signal and the output signal have the relevant logical levels. These can be the same levels or different levels depending on the specific implementation. The present invention is described below with respect to the two signals having the same logical levels. However, it is evident for the person skilled in the art that an inversion can be used to base the further operation on different logical levels of output and input signals. For the same logical levels, the latch is then set so that the gating stage outputs the first configuration signal only when it receives the tristate control signal at the same time that the input and output signals have the same logical levels.

The present invention is also a method of switching between a first clock signal and a second clock signal. The first clock signal is buffered with a first tristate buffer and the second clock signal is buffered with a second tristate buffer. Either the first clock signal or the second clock signal is output in response to a control signal. The control signal in this context is the signal used to switch, for example, the multiplexer. Generally, the control signal is set in response to a clock selection signal. The clock selection signal has a first state to output the first clock signal and a second state to output the second clock signal. The control signal has a first state for outputting the first clock signal and a second state for outputting the second clock signal. A change of the control signal from the first state to the second state is triggered with an edge of the second clock signal, which is the target output clock signal for this case. A change of the control signal from the second state to the first state is triggered with an edge of the first clock signal, which is the target output clock signal in this case. Furthermore, the first tristate buffer and the second tristate buffer are controlled in response to the combined logical states of the clock selection signal and the control signal. Controlling the tristate buffers in response to the combined logical states of the clock selection signal and the control signal provides for a stable situation that will always be assumed by the clock switch according to the present invention. A first static state occurs when the clock selection signal and control signal are both in the first state. A second static state occurs when the clock selection signal and the control signal are both in the second state. In these static states, the first tristate buffer and the second tristate buffer can be turned ON. Further, there can be a first and a second transitional state when the clock selection signal and the control signal are in different states as explained hereinabove.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
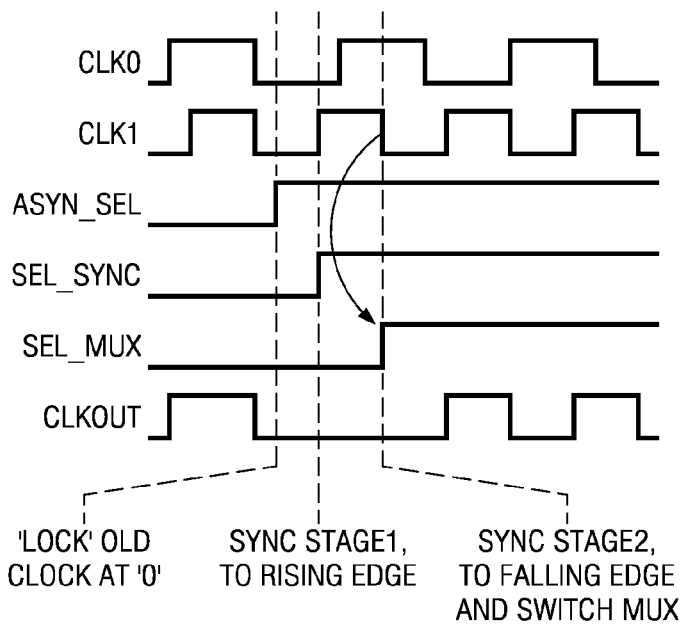
FIG. 1 is a diagram illustrating waveforms relating to a clock switch according to the prior art.
Figure 2:
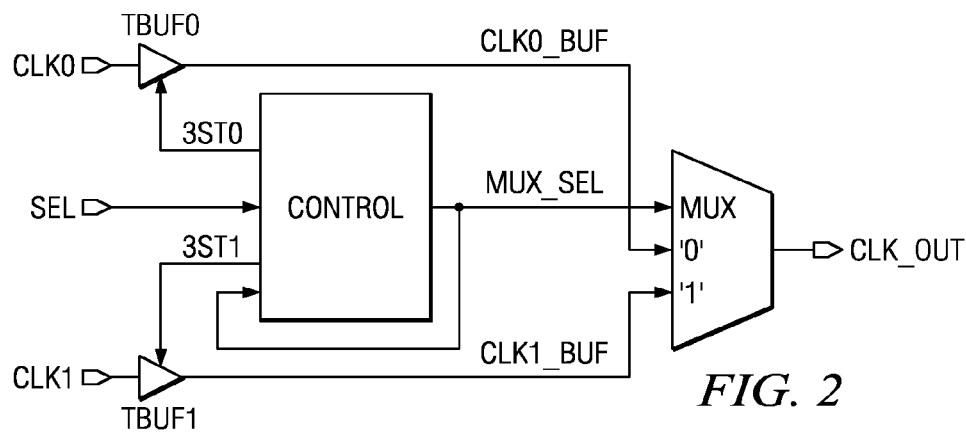
FIG. 2 is a simplified circuit diagram of an embodiment of the present invention.

FIG. 2 is a simplified circuit diagram of an embodiment of the present invention. FIG. 2 illustrates control stage CONTROL coupled to first tristate buffer TBUF0, second tristate buffer TBUF1 and a multiplexer MUX. First tristate buffer TBUF0 receives first clock signal CLK0 and outputs buffered first clock signal CLK0_BUF. Second tristate buffer TBUF1 receives second clock signal CLK1 and outputs second buffered clock signal CLK1_BUF. Tristate buffers TBUF0 and TBUF1 receive respective tristate control signals 3ST0 and 3ST1 for switching respective tristate buffers into tristate mode. In the tristate mode, tristate buffers TBUF0 and TBUF1 have a high impedance output. Control stage CONTROL receives clock select signal SEL and produces multiplexer control signal MUX_SEL for controlling multiplexer MUX. Multiplexer MUX receives buffered first clock signal CLK0_BUF and buffered second clock signal CLK1_BUF at respective inputs '0' and '1.' Multiplexer MUX switches either input '0' or input '1' through to its output on multiplexer output node CLK_OUT in response to multiplexer control signal MUX_SEL. Multiplexer control signal MUX_SEL is also coupled to an input of control stage CONTROL providing feedback. This allows control stage CONTROL to form internal states in response to clock select signal SEL and multiplexer control signal MUX_SEL.

Figure 3:
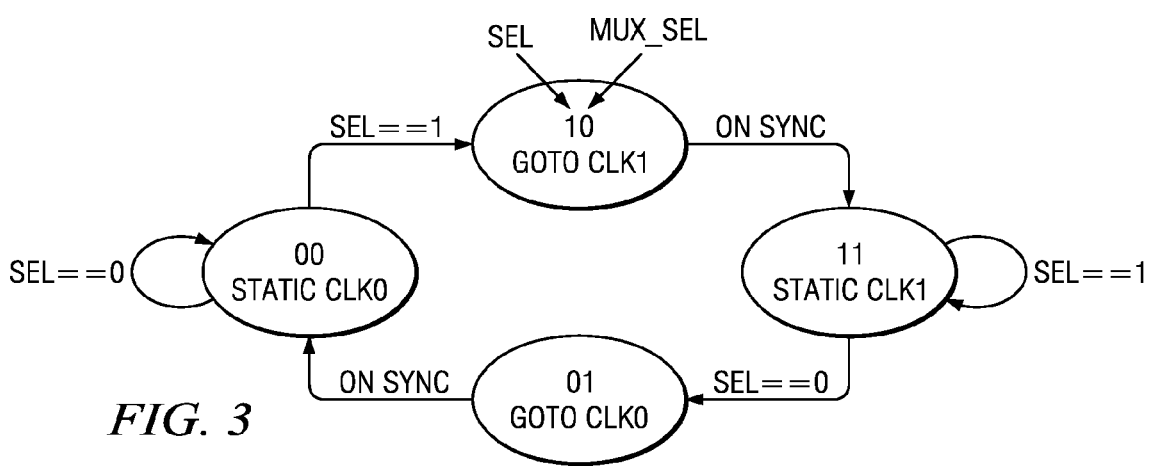
FIG. 3 is a state diagram illustrating aspects of the present invention.

FIG. 3 shows a state diagram illustrating aspects of the present invention. In particular, control stage CONTROL shown in FIG. 2 operates as illustrated in FIG. 3. There are four different states 00, 01, 10, 11, which relate to two different states of the two signals, clock selection signal SEL and multiplexer control signal MUX_SEL. If control stage CONTROL is in state 00 and the clock selection signal SEL remains at 0, then control stage CONTROL also remains in this first static state 00. However, if clock selection signal SEL changes to 1, then control stage CONTROL leaves first static state 00 and proceeds to first transitional state 10. The clock selection signal SEL indicates by the first state (i.e. logical 1) that second clock signal CLK1 should be output at output node CLK_OUT. However, in transitional state 10 multiplexer control signal MUX_SEL is still in the first state (i.e. logical state 0). Control stage CONTROL remains in this first transitional state (i.e. 10) until the multiplexer control signal MUX_SEL is synchronized to the target output clock CLK1. When synchronization is achieved as indicated by ON SYNC, control stage CONTROL proceeds to second static state 11. In this second static state, second clock signal CLK1 is output from output node CLK_OUT. As long as the clock selection signal SEL is at logical 1, control stage CONTROL and thereby the control switch remains in second static state 11. However, if clock selection SEL switches to logical 0, control stage CONTROL leaves second static 11 state and proceeds to second transitional state 01. In this state, multiplexer control signal MUX_SEL is synchronized with the target output clock CLK0. As soon as synchronization is accomplished, which is indicated by ON SYNC, control stage CONTROL proceeds to first static state 00, where first clock signal CLK0 is output. The closed loop configuration of FIG. 3 illustrates that control stage CONTROL implements a state machine. This state machine automatically advances to a static state (i.e. either first static state 00 or second static state 11) for all states of clock selection signal SEK and multiplexer control signal MUX_SEL.

Table 1 summarizes the states and relating signals.

TABLE 1

| SEL | MUX_SEL | State | Comment |
|---|---|---|---|
| 0 | 0 | STATIC CLK0 | MUX passes CLK0. Buffers TBUF0 and TBUF1 pass respective clocks CLK0 and CLK1. State maintained until SEL changes to 1. |
| 1 | 0 | GOTO CLK1 | SEL indicates output CLK1, but MUX still passes CLK0. CLK0 is held. No transitions occur at MUX output within 2 cycles of CLK1 clock. Then MUX_SEL changes to 1. |
| 1 | 1 | STATIC and CLK1 | MUX passes CLK1. Buffers TBUF0 TBUF1 pass respective clocks CLK0 and CLK1. State maintained until SEL changes to 0. |
| 0 | 1 | GOTO | SEL indicates output CLK0, but MUX |

TABLE 1-continued

| SEL | MUX_SEL | State | Comment |
|-----|---------|-------|---------|
|     |         | CLK0  | still passes CLK1. CLK0 is held. No transitions occur at MUX output within 2 cycles of CLK0 clock. Then MUX_SEL changes to 0. |

Figure 4:
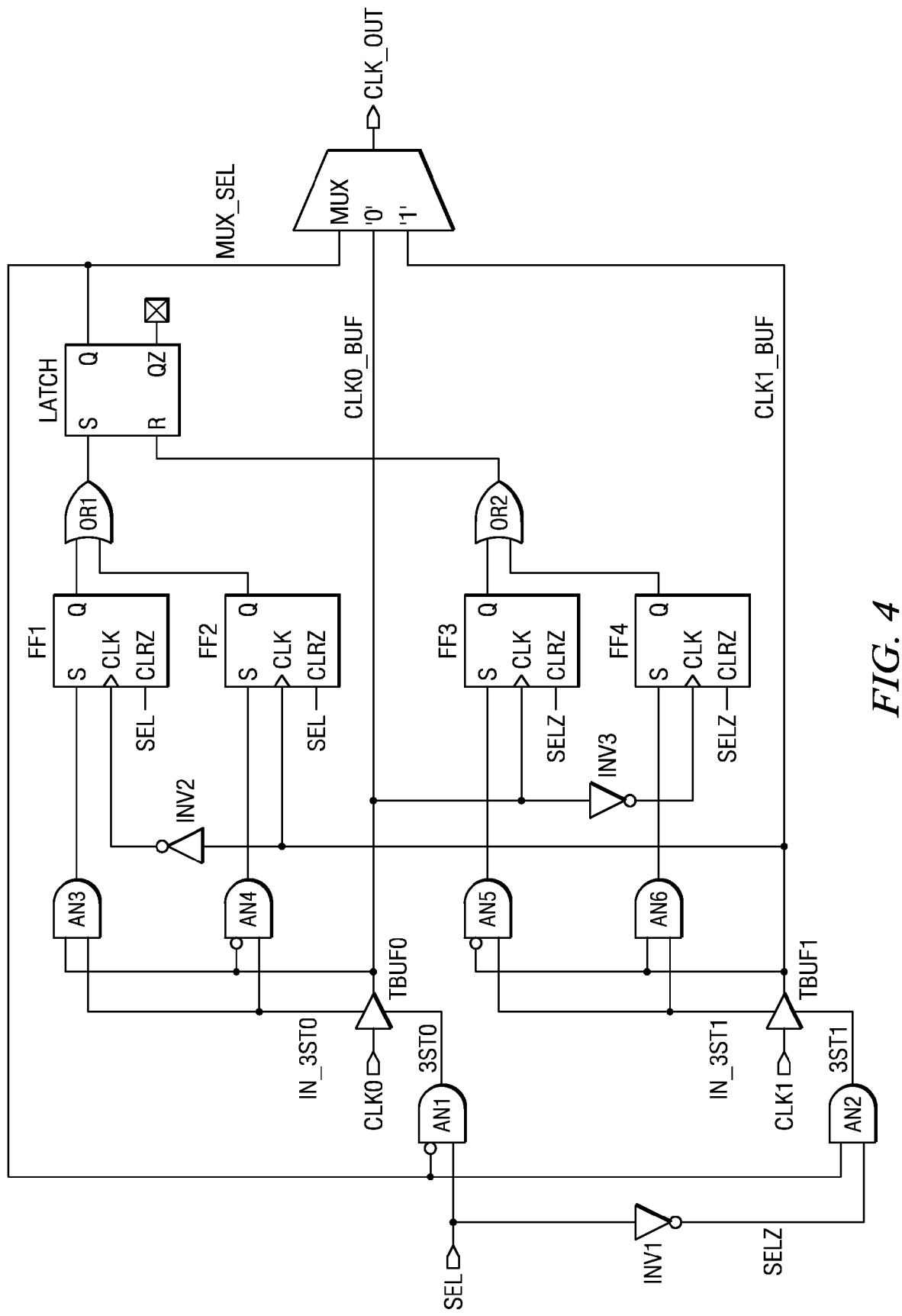
FIG. 4 is a simplified circuit diagram of an embodiment of the present invention.

FIG. 4 shows a more detailed simplified circuit diagram of an embodiment of the present invention. First and second tristate buffers TBUF0 and TBUF1 receive respective first clock signal CLK0 and second clock signal CLK1. Tristate buffers TBUF0 and TBUF1 output respective buffered first clock signal CLK0_BUF and buffered second clock signal CLK1_BUF. Buffered clock signals CLK0_BUF and CLK1 BUT are fed to multiplexer MUX. Multiplexer MUS is controlled by multiplexer control signal MUX_SEL. Tristate buffers TBUF0 and TBUF1 are controlled by respective tristate control signals 3ST0 and 3ST1. First and second AND gates AN1 and AN2 produce respective tristate control signals 3ST0 and 3ST1. Control stage CONTROL includes AND gates AN1 to AN6, inverters INV1 to INV3, flip-flops FF1 to FF4, a latch (RS flip-flop) and two OR gates OR1 and OR2. Multiplexer control signal MUX_SEL is fed back to an input of control stage CONTROL. A complementary version of multiplexer control signal MUX_SEL is input to the first AND gate AN1 via an inverted input of the AND gate. AND gate AN2 receives a complementary version of clock select signal SEL (called SELZ) via inverter INV1 at a first input and receives multiplexer control signal MUX_SEL at a second input. Either AND gate AN2 sets first tristate control signal 3ST0 for first tristate buffer TBUF0 to logical 1 or AND gate AN1 sets second tristate control signal 3ST1 for second tristate buffer TBUF1 to logical 1 in response to clock select signal SEL and multiplexer control signal MUX_SEL. If tristate buffer TBUF0 or TBUF1 is successfully set into tristate, the corresponding signal IN_3ST0 or IN_3ST1 goes high, i.e. to logical 1. A specific delay within tristate buffers TBUF0 and TBUF1 occurs before the tristate buffer finally enters into tristate. This aspect will be explained below with respect to a specific tristate buffer configuration. However, in a simplified embodiment, signal IN_3ST0 can be provided by signal 3ST0 and signal IN_3ST1 can be directly provided by tristate control signal 3ST1.

The logical gates and flip-flops in the upper part of FIG. 4, i.e. AN3, AN4, FF1, FF2, INV2 and OR1 produce a logical 1 at the output of the OR gate OR1 if the tristate buffer TBUF0 is successfully set into tristate and a rising or falling edge of the buffered version of the second signal CLK1_BUF is received at the clock inputs of the two flip-flops FF1 and FF2. This causes any change of the multiplexer control signal MUX_SEL to occur only in response to a rising or a falling edge of the second clock signal CLK1 (i.e. synchronously to the target output clock), when switching from the first clock CLK0 to the second clock CLK1. The output of the OR gate OR1 is coupled to the input of the RS-flip-flop.

The lower part of the control stage in FIG. 4 includes AND gates AN5, AN6, inverter INV3, OR gate OR2 and two flip-flops FF3 and FF4. These logical states and flip-flops implement a complementary function to the upper circuit of FIG. 4. If signal IN_3ST1 goes high and clock select signal SEL is logical 0, a logical 1 will be produced at the output of OR gate OR2 in response to an edge of buffered first clock signal CLK0_BUF.

The outputs of OR gates OR1 and OR2 control RS flip-flop LATCH. A logical 1 at the reset input R and a logical 0 at the set input S produces a logical 0 at output Q of RS flip-flop LATCH. A logical 1 at set input S and a logical 0 at reset input R a logical 0 produces logical 0 at output X of RS flip-flop LATCH. R and S inputs both set to 1 is not allowed. If both R and S inputs are 0, the output is unchanged. Output Q of RS flip-flop LATCH provides multiplexer control signal MUX_SEL.

Flip-flops FF1 and FF2 receive clock selection signal SEL at their clock inputs CLRZ. These clear flip-flops FF1 and FF2. This means that outputs Q are set to logical 0 if clock selection signal SEL is logical 0. Inverted or complementary clock selection signal SELZ is applied to the clock inputs CLRZ of flip-flops FF3 and FF4. This causes the output of second OR gate OR2 to remain at logical 0 as long as clock selection signal SEL is logical 1. Thus only input S or input R of RS flip-flop LATCH can be logical 1.

Accordingly, control stage CONTROL according switches multiplexer control signal MUX_SEL in response to clock select signal SEL, but only synchronized with the respective target output clock. If clock select signal SEL is a logical 0, output clock CLK_OUT should be first clock signal CLK0. However, if multiplexer control signal MUX_SEL is at logical 0 no transition is necessary and control stage CONTROL remains in the first static state. If multiplexer control signal MUX_SEL is at logical 1, control stage CONTROL is in a transitional state. This transitional state only occurs if second clock signal CLK1 was previously output at multiplexer output CLK_OUT. In this situation, multiplexer control signal MUX_SEL must be synchronized with the target output clock (CLK0) before multiplexer MUX can switch. Then, control stage CONTROL falls into static state 00 shown in FIG. 3.

If clock selection signal SEL is logical 1 and multiplexer control signal MUX_SEL is also logical 1, no change is required and control stage CONTROL remains in the second static state. However, if multiplexer control signal MUX_SEL is logical 0, this indicates first clock signal CLK0 was previously output through multiplexer MUX as output clock signal CLK_OUT. In this situation, control stage CONTROL is in a transitional state and multiplexer control signal MUX_SEL must be changed to logical 1 synchronously with target output clock signal CLK1.

Moreover, the tristate buffers TBUF1 and TBUF2 are temporarily switched off during transitional states and switched on during static states. Consider the upper part of FIG. 4 for an example switching from first clock CLK0 to second clock CLK2. AND gates AN3 and AN4 logically combine output signal CLK0_BUF of first tristate buffer TBUF0 with signal IN_3ST0. Signal IN_3ST0 indicates that TBUF0 has been successfully set into tristate. Due to internal delays in tristate buffer TBUF0 explained in more detail below, signal IN_3ST0 is delayed with respect to tristate control signal 3ST0. After a delay defined by the internal structure of tristate buffer TBUF0, IN_3ST0 will be logical 1. If CLK0_BUF is also at 1, logical AND gate AN3 will output a logical 1. If CLK0_BUF is equal to 0, AND gate AN4 will output a logical 1. Generally, if TBUF0 is set into tristate, the output state of TBUF0 is maintained (frozen) if no other signal is applied to the output node. One of flip-flops FF1 or FF2 will always receive a 1. With either a rising edge of CLK1_BUF or with a falling edge of CLK1_BUF, the respective flip-flop outputs a 1. Therefore, the output of OR gate OR1 will always be set to logical 1 as long as CLK1_BUF performs a transition and TBUF0 is successfully switched into tristate mode. However, when MUX_SEL is switched from logical 0 to logical 1, the output of AND gate AN1 will go low to logical 0 and tristate buffer TBUF0 will switch ON again, i.e. the tristate mode of TBUF0 terminates. As long as MUX_SEL is 0 and SEL is 1, control stage CONTROL is in a transitional mode during which CLK0_BUF is frozen and switching is turned off). Further, when MUX_SEL is 1 and SEL is 0, control stage CONTROL is in another transitional state and tristate buffer TBUF1 is switched into tristate. AND gates AN5, AN6 and flip-flops FF3 and FF4 perform operations corresponding to those described for AND AN3, AN4 and flip-flops FF1 and FF2. When SEL and MUX_SEL are both at logical 0, the transitional state is over and control stage CONTROL reaches a final static state for a transition from CLK1 to CLK0.

Figure 5:
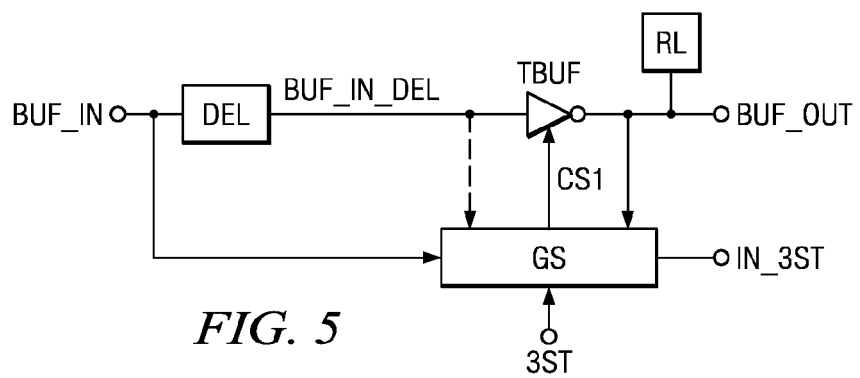
FIG. 5 is a simplified circuit diagram of a tristate buffer according to an embodiment of the invention.

FIG. 5 shows a circuit diagram of a tristate buffer which can be used in the embodiments of FIGS. 2 and 4. Tristate buffer TBUF has an input node which receives input signal BUF_IN, which may be a clock signal. The input node is coupled to the input of delay stage DEL and one input of gating stage GS. Delay stage DEL outputs delayed input signal BUF_IN_DEL which is fed to the input of tristate buffer stage TBUF. Tristate buffer stage TBUF outputs a signal BUF_OUT. A regenerative loop circuit RL is connected to output signal BUF_OUT of tristate buffer stage TBUF to maintain the state of output signal BUF_OUT when tristate buffer stage TBUF enters the tristate mode. Gating stage GS has one input receiving delayed and buffered output signal BUF_OUT from the output of tristate buffer stage TBUF. This signal received by gating stage GS is delayed input signal BUF_IN_DEL after further buffering by the tristate buffer stage TBUF. This is shown in FIG. 5 as a dotted line from the output of delay stage DEL to gating stage GS. Gating stage GS also receives tristate control signal 3ST at an input. Gating state GS outputs signal IN_3ST which indicates that the buffer had successfully entered the high impedance state (tristate). Tristate control signal 3ST is the external signal requesting the buffer to go into tristate. The output of the gating stage GS is connected to an enablement input of tristate buffer stage TBUF providing configuration signal CS1 to switch tristate buffer stage TBUF into the high impedance state.

Table 2 shows the logical levels of the input signal BUF_IN, output signal BUF_OUT, tristate control signal 3ST and configuration signal CS1 during operation of the device shown in FIG. 5.

TABLE 2

| BUF_IN | BUF_OUT | 3ST | CS1 |
|--------|---------|-----|-----|
| 0 | 0 | 0 | 0 |
| 0 | 1 | 0 | 0 |
| 1 | 0 | 0 | 0 |
| 1 | 1 | 0 | 0 |
| 0 | 0 | 1 | 1 |
| 0 | 1 | 1 | 0 |
| 1 | 0 | 1 | 0 |
| 1 | 1 | 1 | 1 |

If configuration signal CS1 is at logical 1, tristate buffer stage TBUF is set to the high impedance state. This is only the case when buffer input BUF_IN and buffer output BUF_OUT have the same state with either both signals are at logical 0 or both signals are at logical 1. If tristate control signal 3ST is at logical 1, a request is pending to set tristate buffer stage TBUF into high impedance state. If tristate control signal 3ST is at logical 0, configuration signal CS1 will remain at logical 0. Gating stage GS generates the appropriate configuration signal CS1 in response to tristate control signal 3ST, BUF_IN and output signal BUF_OUT. If the tristate control signal 3ST is a logical 1, and when both the input signal BUF_IN and the output signal BUF_OUT are at logical 1, configuration signal CS1 can be set to logical 1. The same situation occurs for output signal BUF_OUT and BUF_IN at logical 0. Signals BUF_IN and BUF_OUT having the same state means that no signal transition of input signal BUF_IN is propagating within delay stage DEL or within tristate buffer stage TBUF. When gating stage GS generate configuration signal CS1 at logical 1, tristate buffer stage TBUF will be switched into a high impedance state. However, when input signal BUF_IN is at logical 0 and output signal BUF_OUT is at logical 1, and vice versa, a signal transition of input signal BUF_IN is propagating within delay stage DEL or within the tristate buffer stage TBUF. Therefore, if either of these two logical states is detected by gating stage GS, gating stage GS will not generate a configuration signal CS1, even if tristate control signal 3ST is set. Thus configuration signal CS1 will be logical 0 even if tristate control signal 3ST is logical 1. Since tristate buffer stage TBUF will not switch into a high impedance state unless there is no signal transition of input signal BUF_IN propagating within delay stage DEL, glitches in the output signal BUF_OUT are avoided. A signal transition of input signal BUF_IN can only occur at tristate buffer stage TBUF after the delay time of delay stage DEL. Therefore the buffer of the present invention will not generate glitches when switching into the high impedance state.

With the delayed tristate buffer of this invention, glitches during the asynchronous tristate action are not completely removed. The point of potential glitch generation is moved out of the signal path. If a tristate request coincides with the transition of signal CAN_3ST, a glitch can be generated. However, this glitch is not in the signal path but at the input of a latch which generates the first configuration signal CS1. This glitch may be long enough to set RS flip-flop LATCH or it may be too short to set it. In both cases it will not result in a glitch in the output signal since the delay and detection circuit ensures that a transition of the input signal is not propagating through the tristate buffer at this time.

Generally, since gating stage GS is not in the direct signal path but is connected in parallel with delay stage DEL and tristate buffer stage TBUF, any glitches in tristate control signal 3ST applied to gating stage GS will not be passed to output signal BUF_OUT. The logical level of output signal BUF_OUT is held by regenerative loop RL while tristate buffer TBUF is switched into its high impedance or tristate mode. Due to delay stage DEL and configuration signal CS1, switching of tristate buffer stage TBUF has an advance that is long enough to avoid a transition of input signal BUF_IN occurring when tristate buffer stage TBUF is switched. The critical timing and resulting glitches are moved out of the signal path. This will be explained in further detail with respect to FIGS. 6 and 7.

According to a slightly modified configuration, it is possible to use delayed signal BUF_IN_DEL instead of output signal BUF_OUT. This is indicated in FIG. 5 by a dashed line. This alternative embodiment may be a little less reliable than using BUF_OUT as a second input for gating stage GS, but if the delay of delay stage DEL is chosen appropriately operation will remain the same. It is then possible to replace output signal BUF_OUT in Table 1 by delayed input signal BUF_IN_DEL and corresponding explanations apply to delayed input signal BUF_IN_DEL as to those applied to output signal BUF_OUT.

Figure 6:
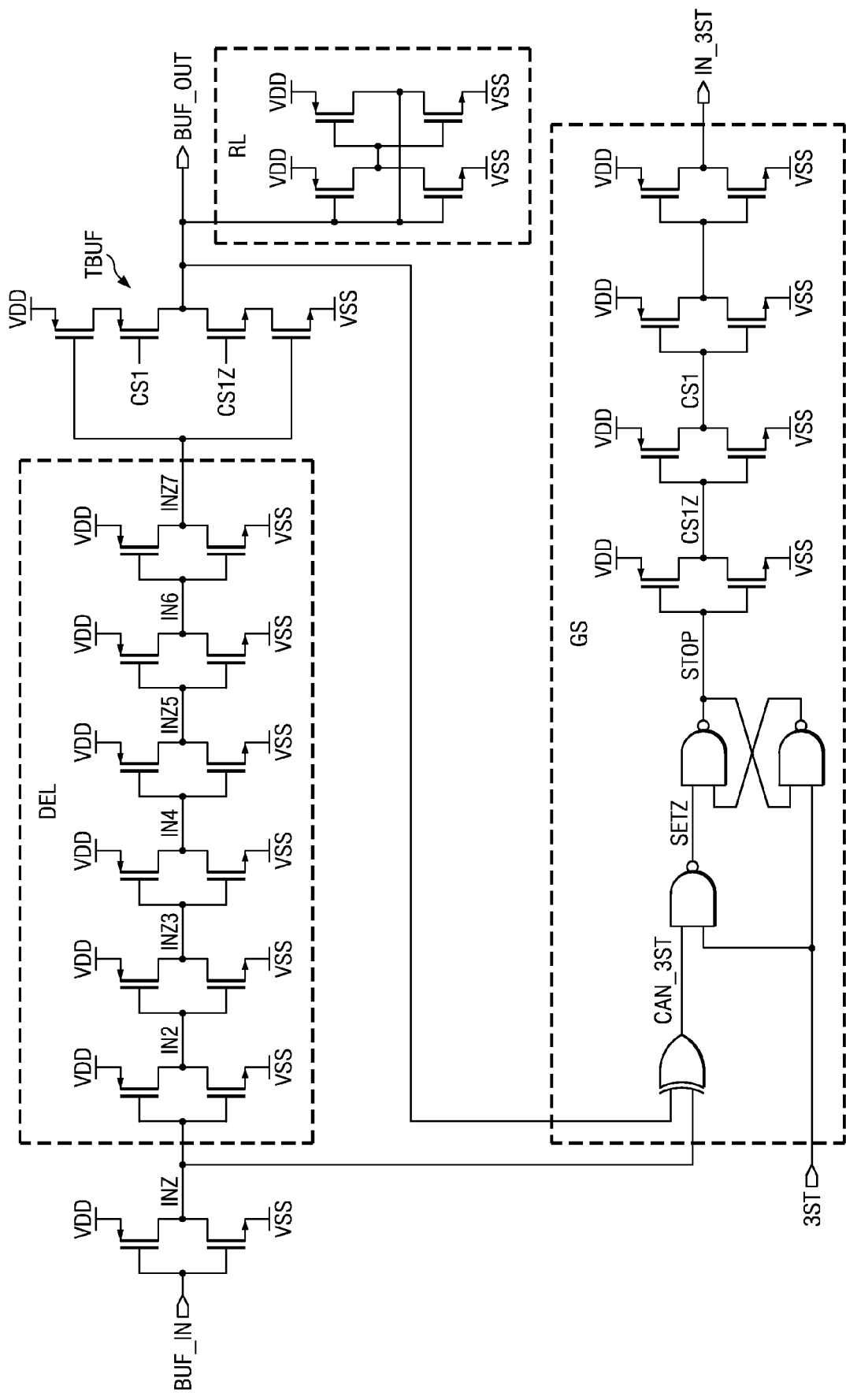
FIG. 6 is a simplified circuit diagram of a tristate buffer according to another embodiment of the present invention.

FIG. 6 shows a preferred embodiment of the invention that operates similarly to the embodiment shown in FIG. 5. In FIG. 6 delay stage DEL is a chain of a plurality of inverters. Each inverter is implemented as a complementary pair of MOS transistors connected between positive supply voltage VDD and negative supply voltage VSS. A letter Z attached to signal name indicates that this is the complementary or inverted signal with respect to a signal having the same name without a Z suffix. Two PMOS and two NMOS transistors connected in series between the positive supply voltage VDD and negative supply voltage VSS form the tristate buffer stage TBUF. One of the NMOS transistors and one of the PMOS transistors have interconnected gate terminals. The gate terminals of the other PMOS and NMOS transistors in tristate buffer stage TBUF form the enablement inputs of tristate buffer stage TBUF and receive complementary configuration signals CS1 and CS1Z gated by gating stage GS. The output signal BUF_OUT of tristate buffer stage TBUF is formed at the interconnection of drain terminals of the central complementary pair of MOS transistors in the series connection. Regenerative loop circuit RL has two pairs of complementary MOS transistors connected in series. Gating stage GS includes an XOR gate connected in series with a NAND gate, two further parallel cross-coupled NAND gates which form a latch and a chain of a plurality of inverters formed of complementary MOS transistor pairs. The XOR gate receives the input signal BUF_IN at one input and the output signal BUF_OUT at its other input. The XOR gate outputs a signal CAN_3ST to one input of a first NAND gate. The other input of the first NAND gate is tristate control signal 3ST. Tristate control signal 3ST is also input to one of the cross-coupled NAND gates. The first NAND gate generates output signal SETZ, which is input to the other input of the cross-coupled NAND gates. If output signal SETZ is low at logical 0, the cross-coupled NAND gate latch is set and signal STOP becomes logical 1. Otherwise, STOP is logical 0. The signal STOP is fed to the input of the inverter chain. The other output of the inverter chain is tristate indication signal IN_3ST. Tristate indication signal IN_3ST can be used as a flag indicating that tristate buffer stage TBUF has been successfully set into the high impedance state. First configuration signal CS1 is generated at the output of one inverter in the inverter chain and the complementary configuration signal CS1Z is generated at the output of the next inverter in the chain.

TABLE 3

| IN_BUF | OUT_BUF | CAN_3ST | 3ST | SETZ | CS1 |
|---|---|---|---|---|---|
| 1 | 0 | 0 | 0 | 1 | 0 |
| 0 | 1 | 0 | 0 | 1 | 0 |
| 1 | 1 | 1 | 0 | 1 | 0 |
| 0 | 0 | 1 | 0 | 1 | 0 |
| 1 | 0 | 0 | 1 | 1 | 0 |
| 0 | 1 | 0 | 1 | 1 | 0 |
| 1 | 1 | 1 | 1 | 0 | 1 |
| 0 | 0 | 1 | 1 | 0 | 1 |

Table 3 shows the relative logical states of the signals generated in the circuit of FIG. 6. The inputs of the XOR gate in gating stage GS span an odd number of inverters in the delay chain forming delay stage DEL. One input of the XOR gate receives the inverted input signal BUF_IN. If there is no transition in the delay stage between the inputs of the XOR gate, then the output of the XOR gate (signal CAN_3ST) is logical 1. As long as CAN_3ST is logical 1 and tristate control signal 3ST is logical 0, the output of the NAND gate having CAN_3ST as an input remains at logical 1. With a signal transition in the delay stage, the inputs of the XOR gate have the same state and signal CAN_3ST is logical 0. The signal CAN_3ST output from the XOR gate serves as a gating signal for asynchronous tristate control signal 3ST and sets the cross-coupled NAND gate latch. Whenever a transition passes through delay stage DEL and through tristate buffer stage TBUF, the tristate control signal 3ST is gated so that signal SETZ is logical 1. As a result, configuration signal CS1 remains at logical 0 and tristate buffer stage TBUF cannot be switched into the high impedance state. This avoids generation of a glitch at the output. However, if no transition occurs in delay stage DEL or within tristate buffer stage TBUF (CAN_3ST is logical 1) and tristate control signal 3ST is logical 1, setting signal SETZ changes to logical 0. Having tristate control signal 3ST at logical 1 and SETZ at logical 0 as inputs, the cross-coupled NAND gate latch is set and output STOP changes from logical 0 to logical 1. As a consequence, configuration signal CS1Z changes to logical 0 and configuration signal CS1 changes to logical 1. Tristate buffer stage TBUF will then be set to the high impedance.

Figure 7:
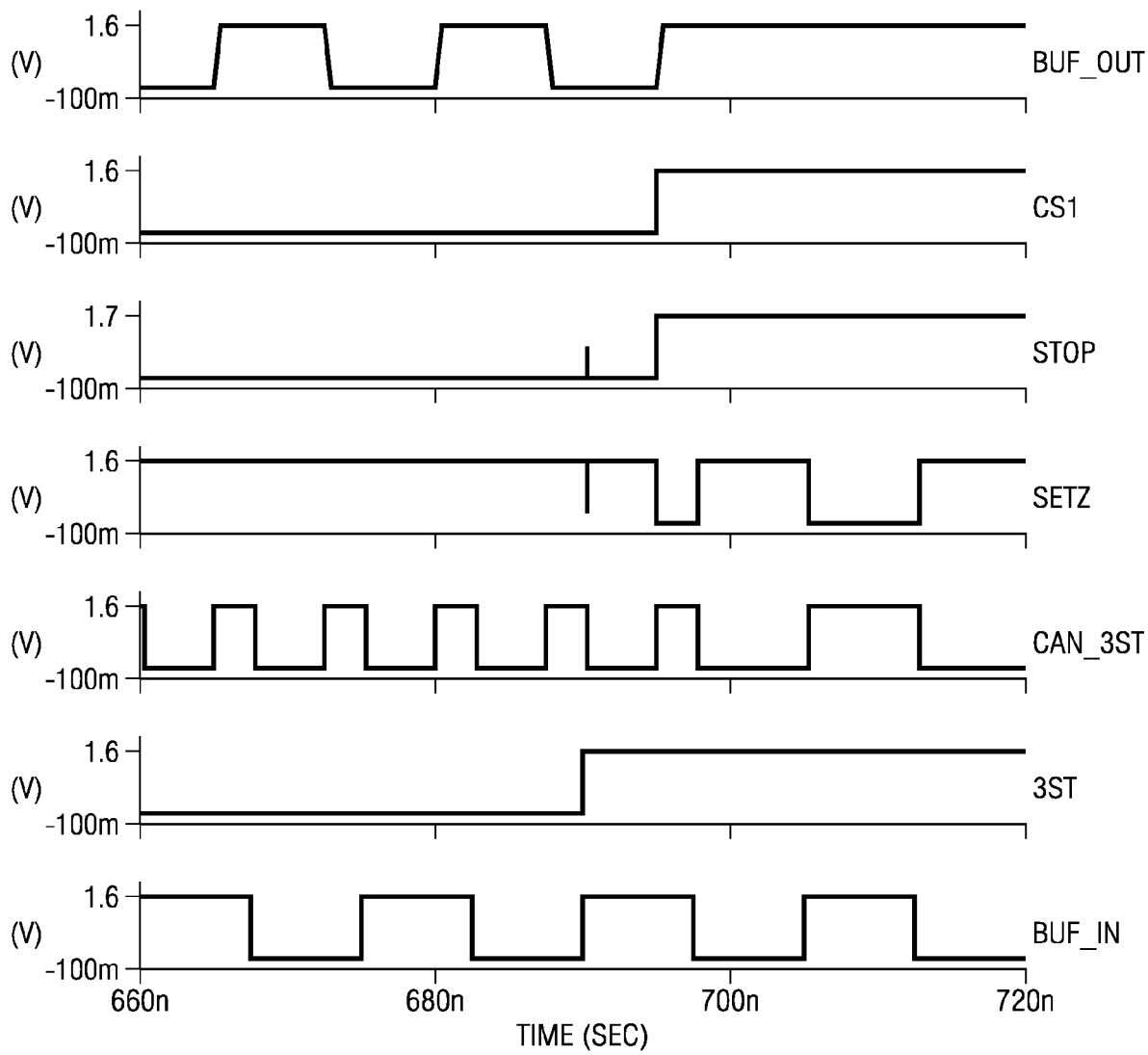
FIG. 7 is a diagram of clock signal transitions of a tristate buffer according to the present invention for a small glitch on the tristate control signal.
Figure 8:
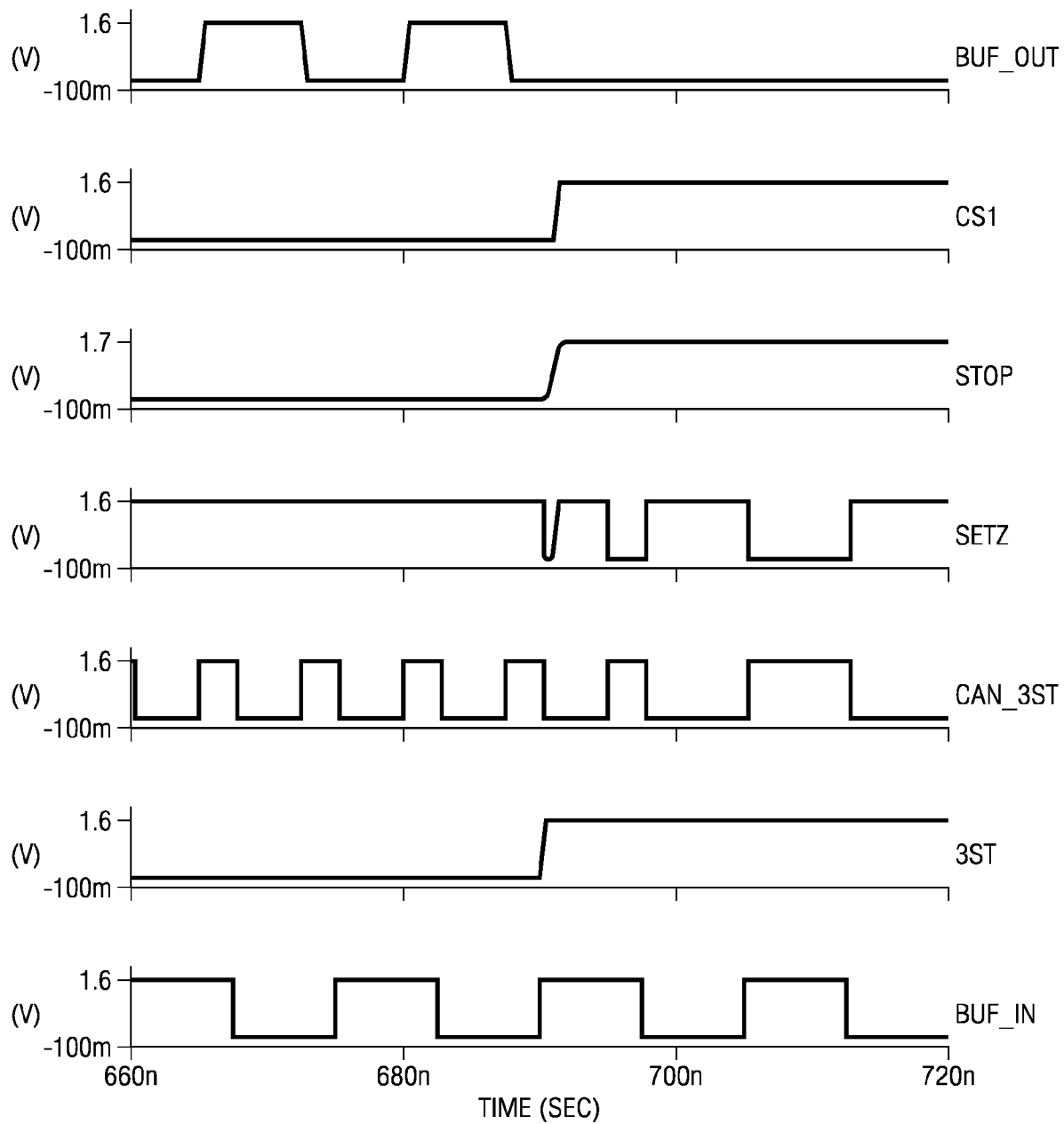
FIG. 8 is a diagram of clock signal transitions of a tristate buffer according to the present invention for a larger glitch on the tristate control signal.

With the arrangement shown in FIG. 6, if a pulse of tristate control signal 3ST coincides with a falling edge of signal CAN_3ST output from the XOR gate, this can lead to a short pulse of signal SETZ output from the first NAND gate. Accordingly, a glitch can occur in the signal SETZ. This situation is further explained with reference to FIGS. 7 and 8. FIGS. 7 and 8 show the relative clock signal transitions in the circuit of FIG. 6 and illustrate that this situation is harmless. If the pulse or glitch of SETZ is too short, as shown in FIG. 7, then the cross-coupled NAND gate latch does not flip over. Accordingly a glitch the signal STOP input to the inverter chain in gating stage GS has no effect since the buffer output signal BUF_OUT is stable at logical 0 or logical 1. However if the pulse is wide enough, as shown in FIG. 8, the cross-coupled NAND gate latch will trigger and STOP changes to logical 1. Because of delay stage DEL the next clock transition in tristate buffer stage TBUF is still underway in delay chain DEL and tristate buffer stage TBUF is switched at time which has sufficient distance to the next edge of the delayed input signal IN_BUF. Thus buffer output signal BUF_OUT will not show a glitch in this situation.

What is claimed is:

1. An electronic clock switch for switching between a first clock signal and a second clock signal providing either the first clock signal or the second clock signal as an output clock signal comprising:
a first tristate buffer (TBUF0) having an input receiving the first clock signal (CLK0), a control input receiving a first tristate control signal (3ST0) and an output having a high impedance tristate output when said first tristate control signal (3ST0) has a predetermined digital state;
a second tristate buffer (TBUF1) having an input receiving the second clock signal (CLK1), a control input receiving a second tristate control signal (3ST1) and an output having a high impedance tristate output when said second tristate control signal (3ST1) has said predetermined digital state;
a multiplexer (MUX) having a first input coupled to said output of said first tristate buffer (TBUF0), a second input coupled to said output of said second tristate buffer (TBUF1), a control input receiving a multiplexer control signal (MUX_SEL) and an output, said multiplexer (MUX) outputting either said first clock signal (CLK0) or said second clock signal (CLK1) at said output in response to a digital state of said multiplexer control signal (MUX_SEL); and
a control stage (CONTROL) having an input receiving a clock selection signal (SEL) having a first digital state indicating output of said first clock signal (CLK0) and a second digital state indicating of output said second clock signal (CLK1), a first output generating said multiplexer control signal (MUX_SEL) having a first digital state controlling said multiplexer (MUX) to output aid first clock signal (CLK0) and a second digital state controlling said multiplexer (MUX) to output said second clock signal (CLK1) through the multiplexer, a second output generating said first tristate control signal (3ST0) from a logical gating of said clock selection signal (SEL) and said multiplexer control signal (MUX_SLE) and a third output generating said second tristate control signal (3ST1) from a logical gating of said clock selection signal (SEL) and said multiplexer control signal (MUX_SLE), said control stage operable whereby a change of said multiplexer control signal (MUX_SEL) from said first digital state to said second digital state is synchronous with an edge of said second clock (CLK1) and a change of said multiplexer control signal (MUX_SEL) from said second digital state to said first digital state is synchronous with an edge of said first clock signal (CLK0).

2. The electronic clock switch of claim 1, wherein:

said first tristate buffer (TBUF0) further generates a first tristate mode signal (IN_3ST0) having a first digital state indicating successful setting of said high impedance tristate output;

said second tristate buffer (TBUF1) further generates a second tristate mode signal (IN_3ST1) having a first digital state indicating successful setting of said high impedance tristate output;

said control stage (CONTROL) includes
  a first AND gate (AN1) having a first inverting input receiving said multiplexer control signal (MUX_SEL), a second input receiving said clock selection signal (SEL) and an output generating said first tristate control signal (3ST0),
  a first inverter (INV1) having an input receiving said clock selection signal (SEL) and an output,
  a second AND gate (AN2) having a first input receiving said multiplexer control signal (MUX_SEL), a second input connected to said output of said first inverter (INV1) and an output generating said second tristate control signal (3ST1),
  a third AND gate (AN3) having a first input connected to said output of said first tristate buffer (TBUF0), a second input receiving said first tristate mode signal (IN_3ST0) and an output,
  a fourth AND gate (AN4) having a first inverting input connected to said output of said first tristate buffer (TBUF0), a second input receiving said first tristate mode signal (IN_3ST0) and an output,
  a second inverter (INV2) having an input receiving said output of said second tristate buffer (TBUF1) and an output,
  a first clocked flip-flop (FF1) having a set input connected to said output of said third AND gate (AN3), a clock input connected to said output of said second inverter (INV2), an inverted clock input receiving said clock selection signal (SEL) and an output,
  a second clocked flip-flop (FF2) having a set input connected to said output of said fourth AND gate (AN4), a clock input connected to said output of said second tristate buffer (TBUF1), an inverted clock input receiving said clock selection signal (SEL) and an output,
  a first OR gate (OR1) having a first input connected to said output of said first clocked flip-flop (FF1), a second input connected to said output of said second clocked flip-flop (FF2) and an output,
  a fifth AND gate (AN5) having a first inverting input connected to said output of said second tristate buffer (TBUF1), a second input receiving said second tristate mode signal (IN_3ST1) and an output,
  a sixth AND gate (AN6) having a first input connected to said output of said second tristate buffer (TBUF1), a second input receiving said second tristate mode signal (IN_3ST1) and an output,
  a third clocked flip-flop (FF3) having a set input connected to said output of said fifth AND gate (AN5), a clock input connected to said output of said first tristate buffer (TBUF0), an inverted clock input connected to said output of said first inverter (INV1) and an output,
  a third inverter (INV3) having an input receiving said output of said first tristate buffer (TBUF0) and an output,
  a fourth clocked flip-flop (FF4) having a set input connected to said output of said sixth AND gate (AN6), a clock input connected to said output of said third inverter (INV3), an inverted clock input connected to said output of said first inverter (INV1) and an output,
  a second OR gate (OR2) having a first input connected to said output of said third clocked flip-flop (FF3), a second input connected to said output of said fourth clocked flip-flop (FF4) and an output, and
  a RS flip-flop (LATCH) having a set input connected to said output of said first OR gate (OR1), a reset input connected to said output of said second OR gate (OR2) and an output generating said multiplexer control signal (MUX_SEL).

3. The electronic clock switch of claim 1, wherein:

said first tristate buffer (TBUF0) and said second tristate buffer (TBUF1) each include
  a delay stage (DEL) having an input connected to said input of said tristate buffer and an output,
  a tristate buffer stage (TBUF) having an input connected to said output of said delay stage, a control input and an output, and
  a gating stage (GS) having a first input connected to said input of said tristate buffer, a second input connected to said output of said tristate buffer stage (TBUF), a third input receiving said tristate control signal (3ST), a first output generating a configuration signal (CS1) connected to said control input of said tristate buffer (TBUF) and a second output generating tristate mode signal (IN_3ST) having a first digital state indicating successful setting of said high impedance tristate output.

4. The electronic clock switch of claim 3, wherein:

said gating stage (GS) includes
  an exclusive OR gate having a first input connected to said input of said tristate buffer, a second input connected to said output of said tristate buffer stage (TBUF) and an output,
  an AND gate having a first input connected to said output of said exclusive OR gate, a second input receiving said tristate control signal (3ST) and an output,
  a cross-coupled NAND gate latch having a first input connected to said output of said AND gate, a second input receiving said tristate control signal (3ST) and an output, and
  a chain of a plurality of inverters each having an input and an output, said input of a first inverter in said chain connected to said output of said cross-coupled NAND gate latch, said input of each inverter in said chain other than said first inverter connected to said output of a prior inverter in said chain, said output of a last inverter in said chain generating said tristate mode signal (IN_3ST) and said output of a predetermined intermediate inverter in said chain generating said configuration signal (CS1).

5. The electronic clock switch of claim 1, wherein:
said first tristate buffer (TBUF0) and said second tristate buffer (TBUF1) each include
a delay stage (DEL) having an input connected to said input of said tristate buffer and an output,
a tristate buffer stage (TBUF) having an input connected to said output of said delay stage, a control input and an output, and
a gating stage (GS) having a first input connected to said input of said tristate buffer, a second input connected to said output of said delay stage (DEL) and a third input receiving said tristate control signal (3ST), a first output generating a configuration signal (CS1) connected to said control input of said tristate buffer (TBUF) and a second output generating tristate mode signal (IN_3ST) having a first digital state indicating successful setting of said high impedance tristate output.

6. The electronic clock switch of claim 5, wherein:
said gating stage (GS) includes
an exclusive OR gate having a first input connected to said input of said tristate buffer, a second input connected to said output of said delay stage (DEL) and an output,
an AND gate having a first input connected to said output of said exclusive OR gate, a second input receiving said tristate control signal (3ST) and an output,
a cross-coupled NAND gate latch having a first input connected to said output of said AND gate, a second input receiving said tristate control signal (3ST) and an output, and
a chain of a plurality of inverters each having an input and an output, said input of a first inverter in said chain connected to said output of said cross-coupled NAND gate latch, said input of each inverter in said chain other than said first inverter connected to said output of a prior inverter in said chain, said output of a last inverter in said chain generating said tristate mode signal (IN_3ST) and said output of a predetermined intermediate inverter in said chain generating said configuration signal (CS1).

7. A method of switching between a first clock signal and a second clock signal, the method comprising:
buffering the first clock signal with a first tristate buffer;
buffering the second clock signal with a second tristate buffer;
outputting either the first clock signal (CLK0) or the second clock signal (CLK1) as the output clock signal in response to a control signal (MUX_SEL);
receiving a clock selection signal (SEL) indicating in a first state to output the first clock signal (CLK0) and in a second state to output the second clock signal (CLK1);
providing a control signal (MUX_SEL) having a first state for outputting the first clock signal (CLK0) and a second state for outputting the second clock signal (CLK1);
triggering a change of the control signal from the first state to the second state with an edge of the second clock signal (CLK1);
triggering a change of the control signal from the second state to the first state with an edge of the first clock signal (CLK0); and
controlling the first tristate buffer and the second tristate buffer in response to the combined logical states of the clock selection signal (SEL) and the control signal (MUX_SEL).

8. The method of claim 7, further comprising:
controlling a tristate mode of said first tristate buffer (TBUF0) from an logical AND of a complement of said multiplexer control signal (MUX_SEL) and said clock selection signal (SEL); and
controlling a tristate mode of said second tristate buffer (TBUF1) from a logical AND of said multiplexer control signal (MUX_SEL) and a complement of said clock selection signal (SEL).

9. The method of claim 7, further comprising:
entering a first static state (STATIC CLK0) when said clock selection signal (SEL) and said multiplexer control signal (MUX_SEL) are both in said first digital state;
entering a first transitional state (GOTO CLK1) when the clock selection signal (SEL) is in the second digital state and the multiplexer control signal (MUX_SEL) is in the second digital state;
entering a second static state (STATIC CLK1) when said clock selection signal (SEL) and said multiplexer control signal (MUX_SEL) are both in said second digital state;
entering a second transitional state (GOTO CLK0) when the clock selection signal (SEL) is in the second state and the multiplexer control signal (MUX_SEL) is in the first state;
outputting said first clock signal (CLK0) in said first stable state and said first transitional state;
outputting said second clock signal (CLK1) in said second stable state and said second transitional state;
switching ON said first tristate buffer (TBUF0) and said second tristate buffer (TBUF1) in said first stable state and said second stable state; and
setting said first tristate buffer (TBUF0) and said second tristate buffer (TBUF1) into tristate mode in said first transitional state and said second transitional state.

10. The method of claim 9, further comprising:
transitioning from said first transitional state to said second stable state upon change of said multiplexer control signal (MUX_SEL) in synchronization with said second clock signal (CLK1).

11. The method of claim 9, further comprising:
transitioning from said second transitional state to said first stable state upon change of said multiplexer control signal (MUX_SEL) in synchronization with said first clock signal (CLK0).

* * * * *